United States Patent Office 3,087,622
Patented Apr. 30, 1963

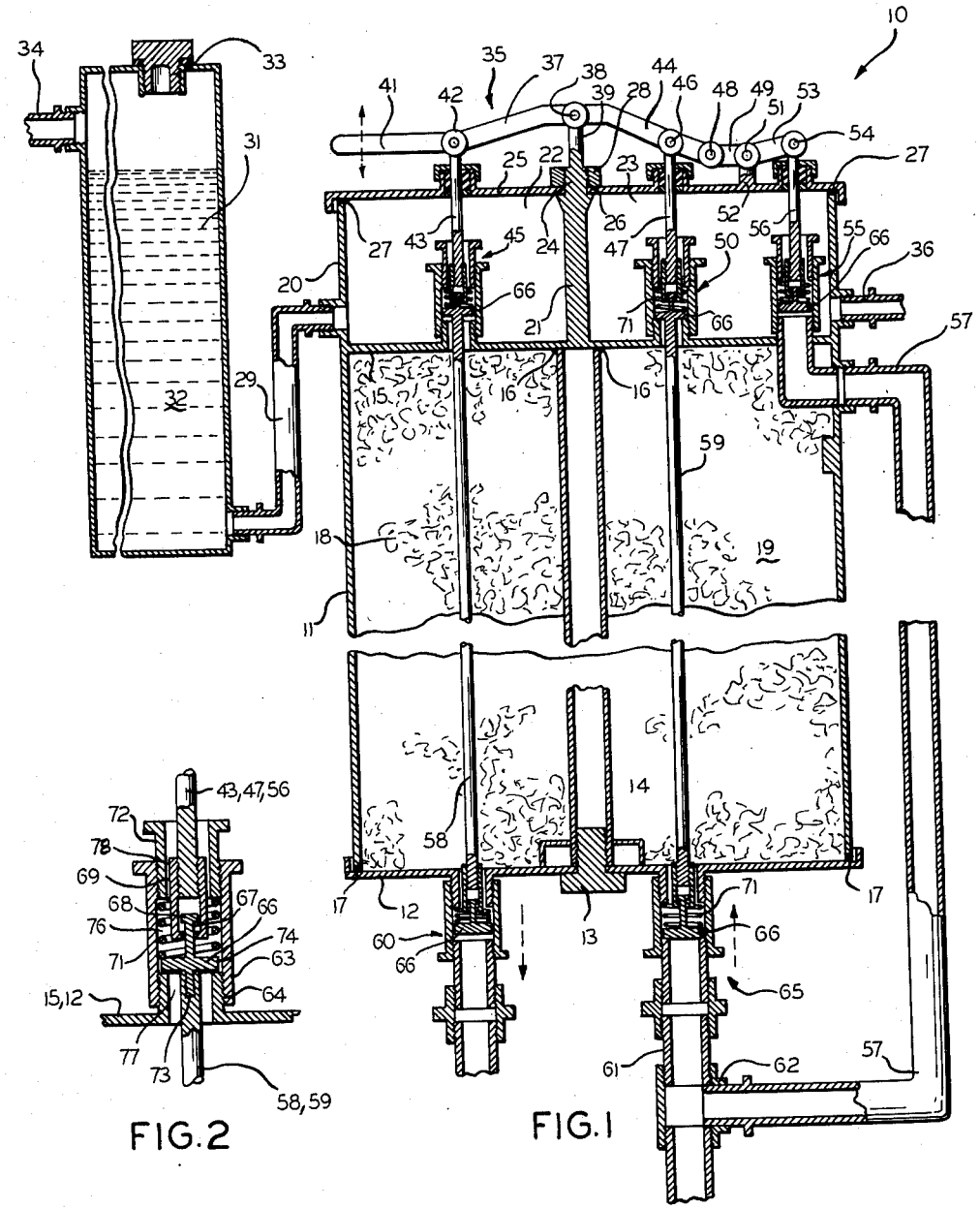

3,087,622
OIL FILTER WITH CLEANING MEANS
Richard E. Abbott, 10 SE. 4th St., Gainesville, Fla.
Filed Aug. 24, 1959, Ser. No. 835,530
2 Claims. (Cl. 210—409)

This invention relates to oil filters, and particularly to an improved filter where the cleaning operation is achieved by the actuation of lever controlled valves which cause the filter to be cycled for either cleaning or filtering.

It is a principal object of this invention to provide an improved filter characterized by the use of lever controlled valves which cycle the filter for either cleaning or filtering.

Another object is to provide a filter with a pair of side by side chambers for cleaning fluid and medium to be filtered, called prefilt herein, each chamber having valves therein which are actuated by a lever to positions determinative of whether the filter is filtering or being cleaned.

Another object is to provide a filter characterized by a pair of chambers, one of such chambers being for the purpose of introducing cleaning fluid to the filter and having a valve therein for controlling the admission of cleaning fluid to the filter, the other chamber having a pair of valves therein controlling the flow of a prefilt such as oil or other medium through the filter, or to by-pass said medium when the filter is going through the cleaning cycle, said valves being controlled by a lever determining whether the filter is to be cycled for the cleaning or filtering operation.

Still another object is to provide a filter which can be cycled by the operation of lever controlled valves which cycle the filter for either filtering or cleaning.

Other objects and important features of the invention will be apparent from a study of the specification following taken with the drawing, which together describe and illustrate a preferred embodiment of the invention, and what is now considered to be the best mode of practicing the principles thereof. Other embodiments of the invention will be apparent to those having the benefit of the teachings herein, and such other embodiments are intended to be reserved especially as they fall within the scope of the subjoined claims.

In the drawings, which exemplifies a preferred embodiment of the invention:

FIG. 1 is a longitudinal cross sectional view through a self cleaning filter having the improvements according to the present invention embodied therein:

FIG. 2 is a detailed longitudinal cross sectional view of a typical valve employed with the filter of the present invention.

Referring now to the drawing, the improved self cleaning filter according to the present invention is referred to generally by the reference numeral 10 and includes a cylindrical housing 11 having an end wall 12 which is secured to the housing 11 by means of a securing screw 13 tapped into an axially extending tube 14. The tube 14 is secured to a wall 15 by weldments 16, and a gasket 17 forms a seal between end wall 12 and the cylindrical housing 11. The end walls 12 and 15 thus define a chamber 18 for filtering material 19.

A cylindrical wall 20 extends as a flange beyond the wall 15, and a diametrically extending partition 21 extends from the wall 15 to define two semi-cylindrical cavities 22 and 23. A threaded boss 24 extends from a mid-point on the partition 21, and an end closure 25 from chambers 22 and 23 rests upon a shoulder 26 formed on the partition 21, a sealing gasket 27 being interposed between the extension flange 20 and the closure 25. A securing nut 28 is threaded to the boss 24 to hold the closure 25 in position against the extension 20.

The chamber 22 is connected by a line 29 to a tank 31 containing a quantity of cleaning fluid 32, the tank 31 being adapted to be filled at a convenient filler opening 33. Pressure is maintained upon the cleaning fluid 32 by a line 34 connected to the upper end of the tank 24 at a point above the top level of the fluid 32 therein, the line 34 being connected to any source of compressed air.

The chamber 23 is connected by a line 36 which forms an incoming passageway for engine oil or other medium to be filtered.

For purposes of description herein, chamber 22 is referred to as a cleaning fluid chamber and chamber 23 is referred to as a prefilt or medium chamber. While the filter may be adapted for other uses, it is especially directed to a device for filtering oil from an internal combustion engine.

Cycling of the filter 10 is achieved by lever controlled valves, all under the control of a lever system referred to generally by the reference numeral 35. Lever system 35 includes a first lever 37 which is pivoted at 38 to an extension 39 from the threaded boss 24. The lever 37 has an arm 41, which is pivotally connected at 42 to a valve stem 43 of a cleaning fluid valve indicated generally by the reference numeral 45. Cleaning fluid valve 45 controls the admission of cleaning fluid to the filter chamber 18. The lever 37 also has an arm 44 pivotally connected at 46 to a valve stem 47 of a prefilt valve indicated generally by the reference numeral 50 controlling the admission of oil or other prefilt to be filtered to the filter chamber 18.

The arm 44 has a pivotal connection at 48 to a lever 49 pivoted at 51 to a support 52 extending from the closure 25. Lever 49 has an arm 53 pivotally connected at 54 to a valve stem 56 of a valve indicated generally by the reference numeral 55 controlling the by-pass of the oil or prefilt from line 36 and chamber 23 to a by-pass line 57.

The cleaning fluid valve 45, which controls the introduction of cleaning fluid to the filter chamber 18 is connected by a valve operator 58 connected to a cleaning fluid discharge valve indicated generally by the reference numeral 60 providing for discharge of the cleaning fluid which has been circulated through the filter chamber 18.

The prefilt valve 50 is likewise connected by a valve operator 59 to a filtrate valve indicated generally by the reference numeral 65 for the movement therepast of the filtrate from the filter chamber 18. The filtrate moves past the valve 65 by means of a passageway 61, which is connected at a T 62 to the by-pass line 57.

The valves 45 and 50 are identical in construction, as are valves 60 and 65, and valve 55 is identical to valves 45 and 50 excepting for the fact that it is not coupled to an operator connected to another valve.

Referring now to FIG. 2, which is a longitudinal section through the aforesaid valves, each includes a valve body 63 which is threaded to a hollow boss 64 extending from the end wall 15 or the bottom wall 12 seen in FIG. 1. A valve poppet 66 is adapted to seat upon the end of the boss 64, and has a stem 67 and an end land 68 affording a lost motion connection with a guide 69 threaded to the operator 43, 47 or 56 in the case of the valves 45, 50 and 55.

A valve spring 71 is interposed between the valve poppet 66, and a thimble 72 threaded into the valve body 63. The poppet 66 has a threaded extension 73 therefrom affording means for connecting the valve operators 58 and 59 to the poppet 66.

The outside diameter of the guide 69 is less than the inside diameter of the thimble 72 to afford a passageway 78 therebetween, and the diameter of the poppet 66 is less than the inside diameter of the valve body 63 to form an annular passageway 74 therebetween. When the poppet 66 is lifted from its seat upon the boss 64, fluid can move by the pressure thereon through the annular passageway 78 into a valve chamber 76, and past the annular passageway 74 thereto and to an annular passageway 77 within the hollow boss 64.

The operation of the self cleaning filter 10 is as follows:

The filter 10 can be cycled through a cleaning operation to remove the filtered material from the filter material 19. As seen in FIG. 1, the filter 10 is in a condition corresponding to the cleaning or flushing cycle.

Under such condition, the lever 37 has been rocked in a clockwise direction as shown by the dotted arrow, and the valves 45 and 60 are open, the valve stem 58 connecting the two valves 45 and 60 moving the poppet 66 of the valve 60 from its seat, see the detail of the valve in FIG. 2. The aforesaid rocking movement of the lever 37 causes the concomitant movement of the valve 50 to a closed position, its poppet 66 being closed by the spring 71 and the lost motion between stem 47 and poppet 66. The movement of the poppet 66 and its associated valve stem 59 causes the poppet 66 of valve 65 to close upon its seat.

The aforesaid rocking movement of the lever 37 causes the lever 49 to be rocked in a counterclockwise direction, as shown by the dotted arrow, thereby moving the poppet 66 of the valve 55 from its seat. At such time the oil within the passageway 36 and within the chamber 23 will be by-passed through the line 57 to return to the circulating system at the line 61 at the T connection 62.

It may be noted that while all of the cleaning fluid has moved from the tank 31, the filter may then be dried by the application of compressed air at line 34 through the tank.

The pressure within the tank 31 will force the cleaning fluid through the filter element 19, and at the conclusion of the cleaning operation the operating lever 37 can be rocked in a counterclockwise direction which will close the valve poppet 66 of valve 45 upon its seat, the poppet 66 of the valve 60 at the same time closing upon its seat.

The aforesaid counterclockwise movement of the lever 37 causes the valve 50 to be opened, valve 65 at the same time being opened, the oil or other medium to be filtered being adapted to move first through the valve 50 and then through the filter material 19 to move out of the filter 10 by way of the valve 65 and to the passageway 61.

The aforesaid rocking movement of the lever 37 also causes the lever 49 to be rocked in a clockwise direction, thereby closing poppet 66 of valve 55 upon its seat, at which time the oil or prefilt will not be diverted to the by-pass line 57, all of the flow of the passageway 36 first going to the chamber 23 and then through the valve 50 and through the filter material 19 for filtering, and to pass from the filter 10 by the valve 65.

It will be seen from the foregoing description that there has been provided a new and useful improvement in filters having cleaning means, the cycling of the filter from cleaning to filtering being achieved by the operation of a lever mechanism which controls all of the valves regulating the flow of either the filtrate or the cleaning material through the filter.

While the invention has been described in terms of a preferred embodiment thereof, its scope is intended to be limited only by the claims here appended.

I claim as my invention:

1. In a filter having means for the cleaning of same prior to reuse comprising a housing having a walled main filter chamber therein, a walled cleaning fluid chamber and a walled chamber for a prefilt, said cleaning fluid and prefilt chambers having a wall common with said filter chamber and a partition separating said cleaning fluid and prefilt chambers, means connecting said cleaning fluid chamber to a source of cleaning fluid under pressure, means connecting said prefilt chamber to the prefilt, a cleaning fluid valve disposed in said cleaning fluid chamber and supported on the wall between said cleaning fluid chamber and said filter chamber for admitting cleaning fluid to said filter chamber, a cleaning fluid discharge valve supported on a wall of said filter chamber for discharging fluid from said filter chamber, a valve operator connecting said valves for conjoint operation, a prefilt valve disposed in said prefilt chamber and supported on a wall of said filter chamber for admitting prefilt to be filtered to said filter chamber, a filtrate valve supported on a wall of said filter chamber for discharging filtrate from said filter chamber, a second valve operator connecting said last two named valves for conjoint operation, a bypass valve located in said prefilt chamber for bypassing said prefilt therefrom when cleaning fluid is admitted to said filter chamber, and lever means for actuating said valves according to whether said filter chamber is undergoing filtering or cleaning cycles, comprising a first lever actuating said cleaning fluid valve and said prefilt valve, and a second lever connected to said first lever for operation of said bypass valve, so that the operation of said lever means during the cleaning cycle opens said cleaning fluid discharge valve, said cleaning fluid valve and said bypass valve, and closes said prefilt valve, said filtrate valve, and so that the operation of said lever means during the filter cycle closes said cleaning fluid discharge valve, said cleaning fluid valve and said bypass valve, and opens said prefilt valve and said filtrate valve.

2. In a filter having means for the cleaning of same prior to reuse comprising a housing having a walled main filter chamber therein, a walled cleaning fluid chamber and a walled chamber for a prefilt, said cleaning fluid and prefilt chambers having a wall common with said filter chamber and a partition separating said cleaning fluid and prefilt chambers, means connecting said cleaning fluid chamber to a source of cleaning fluid under pressure, means connecting said prefilt chamber to the prefilt, a cleaning fluid valve disposed in said cleaning fluid chamber and supported on the wall between said cleaning fluid chamber and said filter chamber for admitting cleaning fluid to said filter chamber, a cleaning fluid discharge valve supported on a wall of said filter chamber for discharging fluid from said filter chamber, a valve operator connecting said valves for conjoint operation, a prefilt valve disposed in said prefilt chamber and supported on a wall of said filter chamber for admitting prefilt to said filter chamber, a prefilt valve supported on a wall of said filter chamber for discharging filtrate from said filter chamber, a second valve operator connecting said last two named valves for conjoint operation, a second valve located in said prefilt chamber for bypassing said prefilt therefrom when cleaning fluid is admitted to said filter chamber, and lever means for conjointly actuating said valves according to whether said filter chamber is undergoing filtering or cleaning cycles, so that the operation of said lever means during the cleaning cycle opens said cleaning fluid discharge valve, said cleaning fluid valve and said bypass valve, and closes said prefilt valve, said filtrate valve, and so that the operation of said lever means during the filter cycle closes said cleaning fluid discharge valve, said cleaning fluid valve and said bypass valve and opens said prefilt valve and said filtrate valve.

References Cited in the file of this patent

UNITED STATES PATENTS

| | | |
|---|---|---|
| 218,351 | Weed | Aug. 5, 1879 |
| 591,006 | Parsons | Oct. 5, 1897 |
| 2,338,418 | Forrest et al. | Jan. 4, 1944 |
| 2,439,764 | Walker | Apr. 13, 1948 |
| 2,559,784 | Moore | July 10, 1951 |
| 2,648,440 | Mullins | Aug. 11, 1953 |
| 2,789,695 | Winkler et al. | Apr. 23, 1957 |
| 2,948,400 | Hagen | Aug. 9, 1960 |